US009094483B2

(12) United States Patent
Graessley

(10) Patent No.: US 9,094,483 B2
(45) Date of Patent: Jul. 28, 2015

(54) SYSTEM AND METHOD FOR COLLECTING AND EVALUATING STATISTICS TO ESTABLISH NETWORK CONNECTIONS

(75) Inventor: Joshua Verweyst Graessley, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 1154 days.

(21) Appl. No.: 13/007,461

(22) Filed: Jan. 14, 2011

(65) Prior Publication Data

US 2012/0185582 A1 Jul. 19, 2012

(51) Int. Cl.

| | |
|---|---|
| ***G06F 15/173*** | (2006.01) |
| ***G06F 15/16*** | (2006.01) |
| ***H04L 12/28*** | (2006.01) |
| ***H04L 29/12*** | (2006.01) |
| ***H04L 12/721*** | (2013.01) |
| *H04L 12/26* | (2006.01) |

(52) U.S. Cl.

CPC ............ *H04L 61/6086* (2013.01); *H04L 45/70* (2013.01); *H04L 43/0864* (2013.01)

(58) Field of Classification Search

None

See application file for complete search history.

(56) References Cited

U.S. PATENT DOCUMENTS

| | | | | |
|---|---|---|---|---|
| 6,105,146 | A * | 8/2000 | Tavallaei et al. | 714/2 |
| 6,185,218 | B1 * | 2/2001 | Ratcliff et al. | 370/405 |
| 6,212,185 | B1 * | 4/2001 | Steeves et al. | 370/392 |
| 7,467,225 | B2 * | 12/2008 | Anerousis et al. | 709/238 |
| 8,473,620 | B2 * | 6/2013 | Demmer et al. | 709/227 |
| 2007/0288553 | A1 * | 12/2007 | Donaghey et al. | 709/203 |
| 2009/0080337 | A1 * | 3/2009 | Burns et al. | 370/248 |
| 2009/0271512 | A1 * | 10/2009 | Jorgensen | 709/224 |
| 2009/0304000 | A1 | 12/2009 | Masputra et al. | |
| 2009/0304001 | A1 | 12/2009 | Masputra et al. | |
| 2009/0304005 | A1 | 12/2009 | Masputra et al. | |
| 2009/0304006 | A1 | 12/2009 | Masputra et al. | |

* cited by examiner

*Primary Examiner* — Ninos Donabed
*Assistant Examiner* — Farrukh Hussain
(74) *Attorney, Agent, or Firm* — Park, Vaughan, Fleming & Dowler LLP

(57) ABSTRACT

An apparatus and method are described for collecting and evaluating statistics for different network addresses and/or subnets when establishing network connections. For example, a method according to one embodiment comprises: receiving a set of potential network addresses for establishing a connection to a remote host; evaluating routing statistics associated with each of the potential network addresses; prioritizing the set of potential network addresses based on the evaluation; and initially attempting to connect to the remote host using the highest priority one or more network addresses.

27 Claims, 10 Drawing Sheets

Routing Table 103

| Host/Subnet Address **201** | Routing Data **202** | I/F **203** |
|---|---|---|
| 10.0.1 | Subnet Routing Data A | en1 |
| 10.0.1.26 | Host Routing Data A | en1 |
| 10.0.1.5 | Host Routing Data B | en1 |
| 10.0.1 | Subnet Routing Data B | en0 |
| 10.0.1.26 | Host Routing Data C | en0 |
| 10.0.1.5 | Host Routing Data D | en0 |
| 167.78.89 | Subnet Routing Data C | en0 |
| 167.78.89.12 | Host Routing Data E | en0 |
| 167.78.89.132 | Host Routing Data F | en0 |
| default | Default Routing Data A | en1 |
| default | Default Routing Data B | en0 |

*Fig. 2*
*(Prior Art)*

Routing Table 301

| Group | Host/Subnet Address **310** | Routing Data **311** | I/F **312** | Statistics **302** |
|---|---|---|---|---|
| IPV4 Addresses **450** | 10.0.1 | Subnet Routing Data A | en1 | Accumulated Statistics A |
| | 10.0.1.26 | Host Routing Data A | en1 | Connection Statistics A |
| | 10.0.1.5 | Host Routing Data B | en1 | Connection Statistics B |
| | | | | |
| | 192.168.0 | Subnet Routing Data B | en0 | Accumulated Statistics B |
| | 192.168.0.12 | Host Routing Data C | en0 | Connection Statistics C |
| | 192.168.0.132 | Host Routing Data D | en0 | Connection Statistics D |
| | | | | |
| IPV6 Addresses **451** | fe80:0:0:0:202:b3ff:fe1e | Subnet Routing Data C | en1 | Accumulated Statistics C |
| | fe80:0:0:0:202:b3ff:fe1e:8329 | Host Routing Data E | en1 | Connection Statistics E |
| | fe80:0:0:0:202:b3ff:fe1e:988 | Host Routing Data F | en1 | Connection Statistics F |

SYSTEM AND METHOD FOR COLLECTING AND EVALUATING STATISTICS TO ESTABLISH NETWORK CONNECTIONS

BACKGROUND

1. Field of the Invention

This invention relates generally to the field of data networks. More particularly, the invention relates to an improved system and method for collecting and evaluating statistics to establish network connections.

2. Description of the Related Art

FIG. 1 illustrates a prior art computing device 101 communicatively coupled to a plurality of Local Area Networks (LANs) 120-121 through different communication interfaces en_1 110 and en_0 111. Examples of such local area networks include IEEE 802.3-based networks (Ethernet networks), IEEE 802.11-based networks (e.g., also referred to as "WiFi" networks), and wireless cellular data networks (e.g., such as GPRS or 3G networks). For example, communication interface en_1 110 may be an Ethernet interface for communicating to local hosts 656 over an Ethernet network 120 and communication interface en_0 111 may be an 802.11n WiFi interface for communicating with local hosts 655 over an 802.11n network 121. "Local" in this context refers to the fact that hosts 655 and 656 are connected to the same LAN as computing device 101. Current devices such as the iPhone (designed by the assignee of the present patent application), are equipped with additional interfaces such as Bluetooth interfaces and cellular data interfaces.

Gateway devices 611 and 612 are used to allow the computing device 101 to communicate with remote hosts 650-654 over a larger network 610 (e.g., the Internet) using a networking protocol such as TCP/IP. As illustrated, each of the remote hosts 650-654 may be associated with one or more subnets 125-127 coupled to the Internet through gateways 613-614. All computers that belong to a particular subnet are addressed with a common, identical, most-significant bit-group in their IP address, which is used to route packets across the network 610 to the gateway for that subnet. For example, if the gateway 614 of subnet 126 is identified by the IP address 10.0.1, then hosts 652 and 653 may be assigned IP addresses such as 10.0.1.26 and 10.0.1.5.

Certain hosts such as host 651 may be identified by multiple IP addresses and/or subnets. For example, host 651 may represent a large Internet site with multiple IP addresses associated therewith (e.g., such as Google.com or Yahoo.com). In operation, the computing device 101 may receive a list of the multiple IP addresses from a domain name service (DNS) server in response to a DNS query. The computing device 101 will then typically attempt to connect to the first IP address on this list.

As illustrated in FIG. 1, the computing device includes a networking engine 102 for implementing a network protocol stack. In order for the computing device 101 to communicate over the Internet 610, the network protocol stack must include support for the TCP/IP protocol. An application 105 wishing to communicate over the network 610 must do so by making calls to the networking engine 102.

On some computing devices 101, the networking engine 102 uses a routing table 103 for quickly determining an appropriate route to access a host at a particular IP address. As illustrated in FIG. 2, an exemplary routing table 103 may include a plurality of entries for each host address and/or subnet address 201. Associated with each host/subnet address is routing data 202 which specifies how to connect to a host with a particular IP address. For example, the routing data may identify the networking device (e.g., such as a gateway) to which TCP/IP packets should be transmitted to communicate with a particular host. By way of example, if host 653 has the IP address 167.78.89.12, then the networking engine 102 will identify this entry in the database and attempt to connect to host 653 using Host Routing Data E. In addition, as illustrated in FIG. 2, each entry in the routing table may be associated with one of the computing device's interfaces (en_1 and/or en_0).

If a specific IP address does not exist in the routing table 103 for a host, then the networking engine 102 will determine if routing data is available for the subnet of that host. Returning to the previous example, if host 653 has the IP address 167.78.89.17, then the networking engine 102 will "clone" Subnet Routing Data C for the 167.78.89 subnet and create a new entry in the routing table for host 653 with the "cloned" routing data.

If a routing table entry does not exist for the IP address or subnet address of a particular host, then the networking engine 102 will utilize a default entry for one of the communication interfaces en_1 310 or en_0 311 in the routing table 103 (illustrated in the final two rows in FIG. 2). For example, if the computing device 101 is currently connected to the Internet via interface en_1, then it may use Default Routing Data A to connect to the host. Similarly, if the computing device 101 is currently connected to the Internet via interface en_2, then it may use Default Routing Data A to connect to the host. Once the route to the host has been determined, the networking engine 102 may then update the routing table 103 to include a new routing entry for the host.

One limitation of current systems, however, is that when there are multiple possible routes to a particular host, no mechanism exists for choosing a route based on networking performance. For example, if host 651 is associated with multiple IP addresses which are returned to the computing device 101 via a DNS query, the networking engine 102 will typically just attempt to connect to the first IP address in the list returned by the DNS server (assuming that there are entries in the routing table for both addresses). Under these circumstances, it would be beneficial if the networking engine 102 had the ability to monitor networking performance for the different IP addresses and/or subnets and choose an IP address accordingly. Thus, what is needed is an improved technique for choosing the best route to a particular host.

SUMMARY

An apparatus and method are described for collecting and evaluating statistics for different network addresses and/or subnets when establishing network connections. For example, a method according to one embodiment comprises: receiving a set of potential network addresses for establishing a connection to a remote host; evaluating routing statistics associated with each of the potential network addresses; prioritizing the set of potential network addresses based on the evaluation; and initially attempting to connect to the remote host using the highest priority one or more network addresses.

BRIEF DESCRIPTION OF THE DRAWINGS

A better understanding of the present invention can be obtained from the following detailed description in conjunction with the following drawings, in which:

FIG. 2 illustrates an exemplary routing table employed in a prior art computing system.

FIG. 4 illustrates one embodiment of a routing table for maintaining statistics associated with different subnets and/or host addresses.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention utilizes a networking engine which monitors statistics associated with its network connections to each host and subnet and subsequently utilizes the network statistics when establishing subsequent connections. For example, when the networking engine opens a TCP socket connection to a remote host, it may track networking statistics including, but not limited to, number of packets in/out, number of bytes in/out, number of duplicate bytes received, number of out of order bytes received, number of retransmitted bytes, number of connection attempts, number of successful connections established, minimum round trip time, average round trip time, and average bandwidth. It should be noted however, that the underlying principles of the invention are not limited to any particular set of networking statistics. These values can subsequently be evaluated, either alone or in combination, to determine a "quality level" associated with the TCP socket. Once the quality has been determined for a set of potential host addresses (e.g., provided via a DNS query), a prioritized list may be generated and routing entries having relatively higher priorities may be used to establish the connection. For example, in one embodiment, an attempt is made to connect to one or more of the highest priority of the set of host addresses first. If a connection is unsuccessful within a designated time period, then the networking engine may attempt the next set of one or more highest priority host address on the list.

In addition to maintaining statistics for each individual host address, one embodiment of the invention accumulates the statistics for hosts on the same subnet and generates cumulative statistics for the subnet addresses. The accumulated statistics may then be used to select a particular subnet (e.g., when cloning the routing data from a particular subnet). In one embodiment, the statistics are stored within the routing table used by the networking engine. Moreover, in one embodiment, the techniques described herein are employed with both IP version 4 (IPV4) network addresses and IP version 6 (IPV6) network addresses. Consequently, if a computing device receives both IPV4 and IPV6 addresses in response to a DNS query, it may choose the one which provides the best connectivity to the host (i.e., the route with the highest "quality" level).

Figure 1:
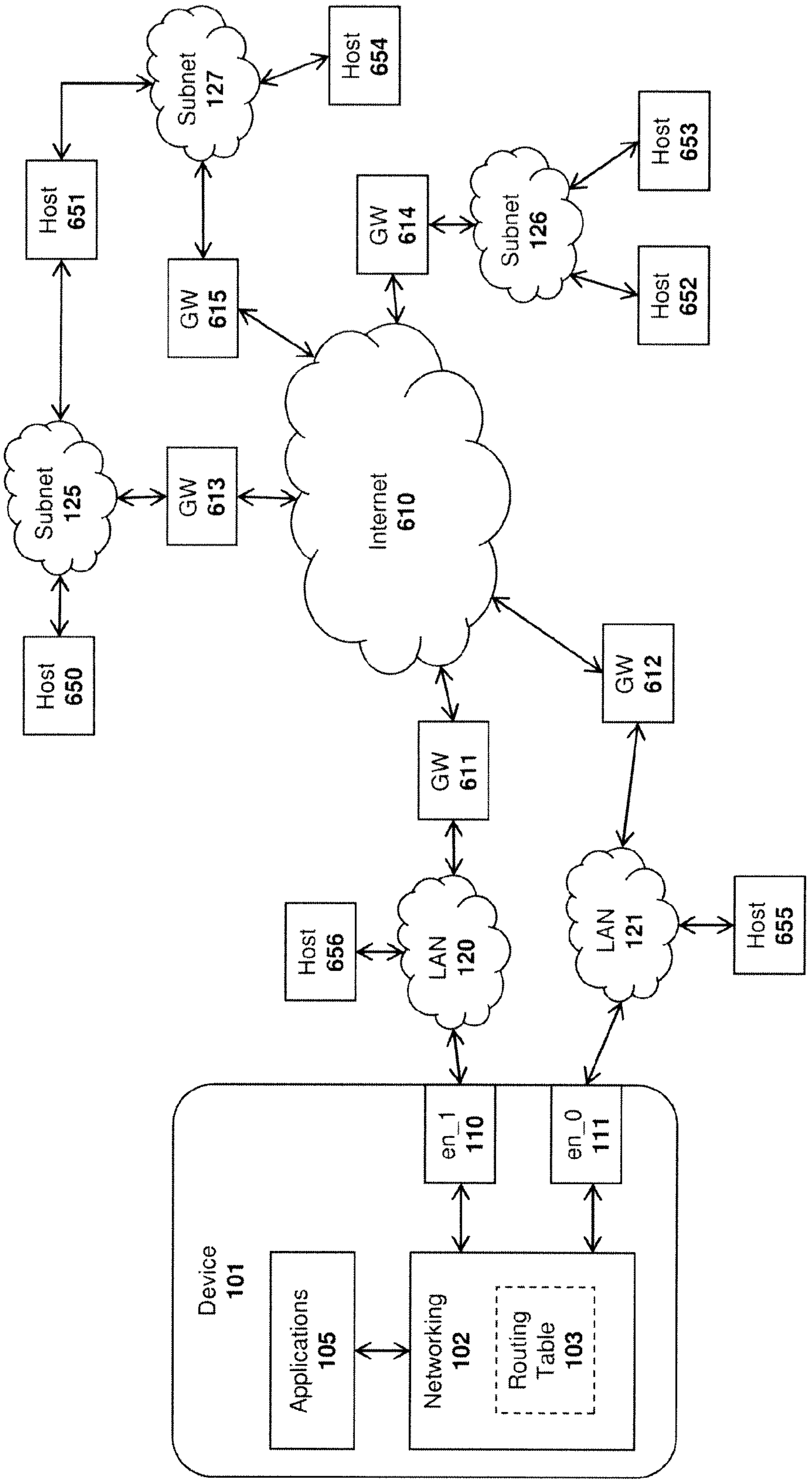
FIG. 1 illustrates a networking architecture for communicating with hosts over a local area network (LAN) and/or a wide area network (WAN) such as the Internet.
Figure 3A:
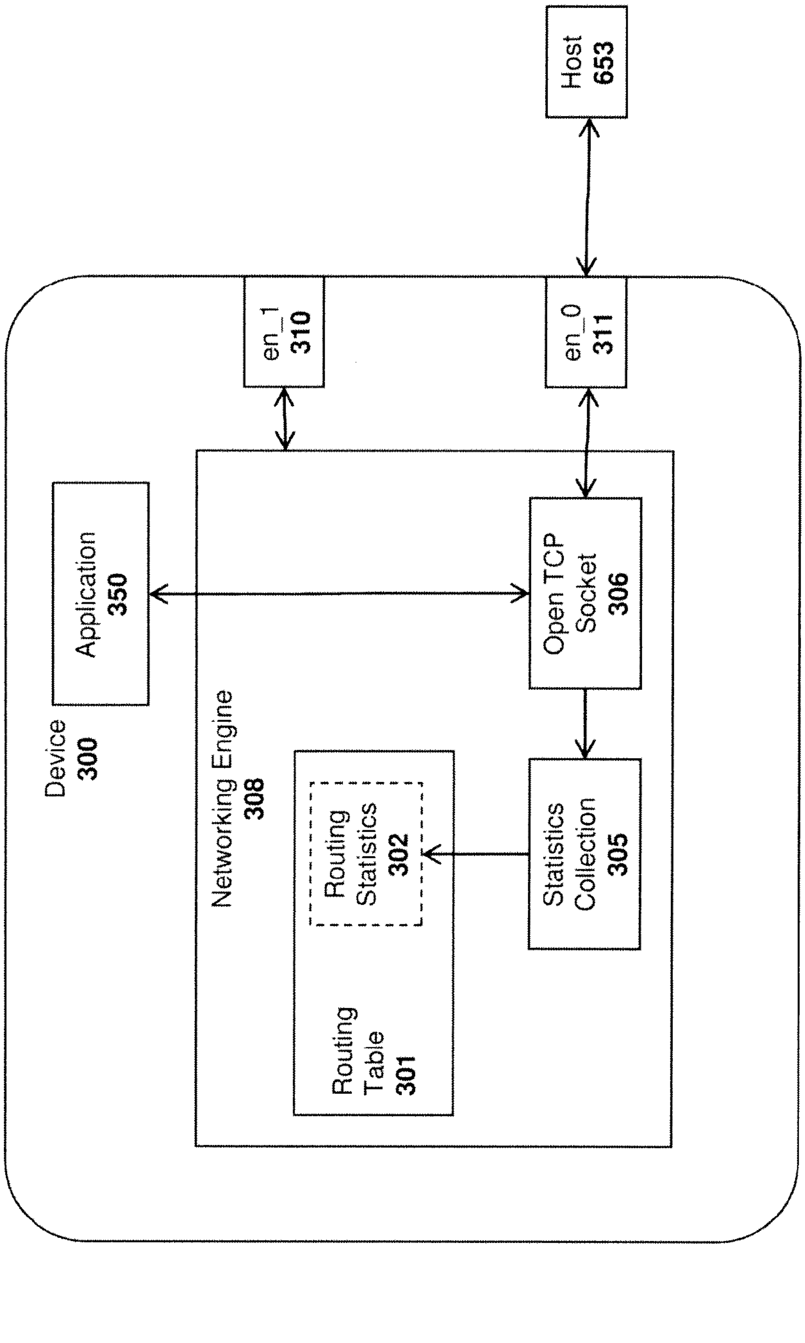
FIGS. 3*a-b* illustrate one embodiment of an architecture for collecting and evaluating statistics for different network addresses and/or subnets when establishing network connections.
Figure 3B:
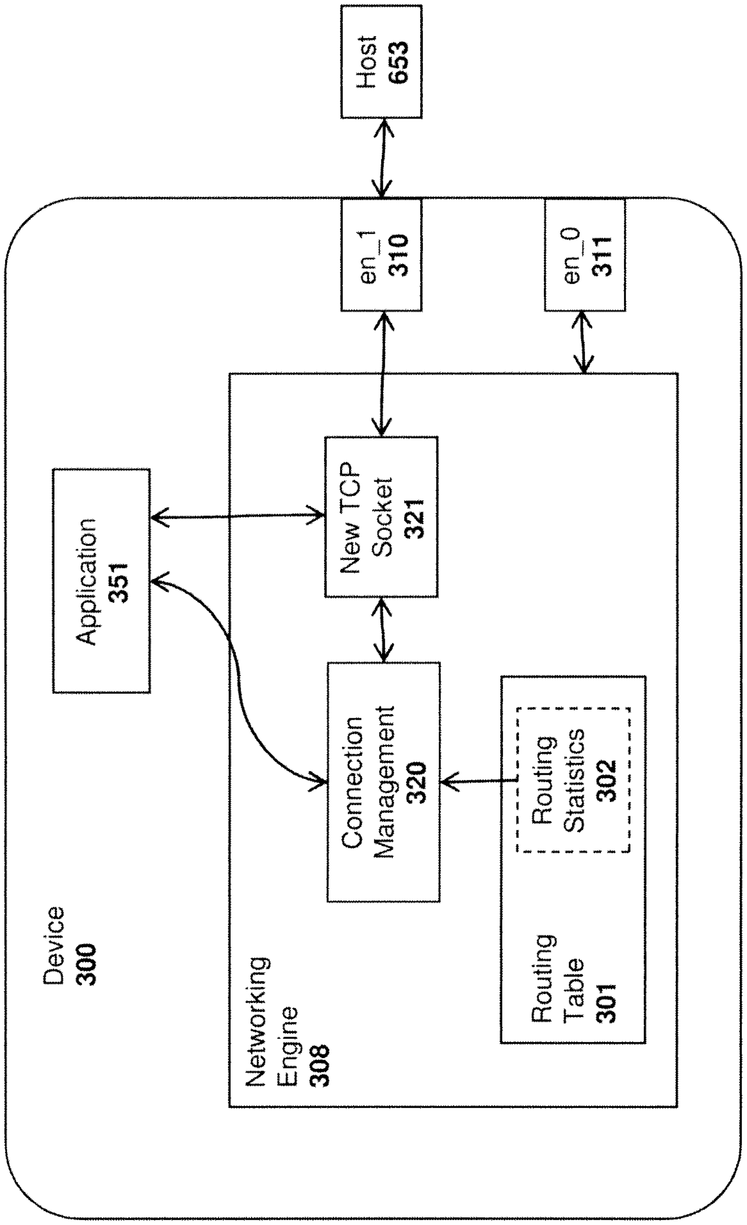

FIG. 3*a-b* illustrate one embodiment of a system architecture on which embodiments of the invention may be implemented and FIG. 4 illustrates an exemplary routing table 301 which includes entries for both IPV4 addresses 450 and IPV6 addresses 451. As is known by those of skill in the art, IPV6 is a version of the Internet Protocol (IP) suite that is designed to succeed Internet Protocol version 4 (IPv4), which is currently in widespread use across the Internet. IPV6 uses a larger address space which is largely incompatible with IPV4. As such, if a particular host on the Internet supports both IPV4 and IPV6, the networking routes for used IPV4 may be completely different than those used for IPV6 (i.e., different gateways, subnets, etc). Moreover, the fact that IPV6 is newer does not necessarily mean that it will result in better performance than IPV4, particularly given the limited support for IPV6 and, in contrast, the widespread use of IPV4. Consequently, one embodiment of the invention tracks statistics for both IPV4 routes and IPV6 routes for a given host and subsequently uses this information when choosing between an IPV6 or an IPV4 connection.

Specifically, in the embodiment shown in FIG. 3*a*, a statistics collection module 305 monitors the statistics for each open TCP socket 306 used for connecting to each host (e.g., such as host 653 shown in FIG. 3*a*). As is understood by those of skill in the art, a TCP socket 306 (also referred to as an "Internet socket") constitutes a networking module for delivering incoming data packets to the appropriate local application process or thread and transmitting outgoing data packets to the appropriate remote host, based on a combination of local and remote IP addresses and port numbers. Each TCP socket 306 is mapped by the networking engine 308 of the computing device to a communicating application process or thread 350. Thus, in one embodiment, an application 350 opens a socket connection and implements the other networking techniques described herein by making an appropriate set of calls to an application programming interface (API) exposed by the networking engine 308 (which may form a portion of the operating system executed on the computing device 300). Exemplary API architectures are described below with respect to FIGS. 6-8. It should be noted, however, that the underlying principles of the invention are not limited to such a configuration.

In one embodiment, the statistics collection module 305 stores the collected routing statistics 302 for the TCP socket 306 within the networking engine's routing table 301. Thus, as shown in FIG. 4, connection statistics A, B, C, and D are maintained for IPV4 host addresses 10.0.1.26, 10.0.1.5, 192.168.0.12, and 192.168.0.132, respectively, and connection statistics E and F are maintained for IPV6 addresses fe80:0:0:0:202:b3ff:fe1e:8329 and fe80:0:0:0:202:b3ff:fe1e:998, respectively. In addition, the combined network statistics of the hosts are calculated and stored for each subnet. For example, in FIG. 4, Connection Statistics A and B are combined (likely with other connection statistics from other hosts in the subnet) and stored as Accumulated Statistics A for subnet address 10.0.1. Similarly, Connection Statistics C and D are combined and stored as Accumulated Statistics B for subnet address 192.168.0 and Connection Statistics E and F are combined and stored as Accumulated Statistics C for IPV6 subnet address fe80:0:0:0:202:b3ff:fe1e.

As shown in FIG. 3*b*, one embodiment of the invention includes a connection management module 320 for evaluating the routing statistics 302 when making routing decisions. In operation, the networking engine 308 may receive multiple potential IPV4 and IPV6 addresses for establishing a new connection returned in response to a DNS query (e.g., www.google.com). The connection management module 320 may then evaluate the statistics associated with each of the host IP addresses and/or associated subnet addresses in the routing table 301 to prioritize the list of IP addresses returned by the DNS query.

Various different statistics may be evaluated by the connection management module (alone or in combination) to determine the relative "quality" of the routes for each IP address and/or subnet. In one particular embodiment, for example, the connection management module 320 chooses the routing data 311 for the IPV4 or IPV6 address which has the smallest average round trip time between the computing device 300 and remote host (also sometimes referred to as "latency"). The average round trip time is often a good indicator of the quality of the route between the computing device 300 and the various hosts.

The connection management module 320 may evaluate various other routing statistics 302 when making routing decisions (either alone or in combination with the round trip time) including, for example, the number of connection attempts and the number of connections established or, conversely, the number of failed connection attempts. For example, if a route to a host over a particular networking interface (e.g., en_1) has a relatively small number of connections established (or a high number of failed connection attempts) relative to the number of connection attempts, then this may indicate an unreliable connection. By contrast, if a route to the same host over an alternative interface (e.g., en_0) has a large number of connections established (or a relatively low number of failed connection attempts) relative to connection attempts, then this may indicate a reliable connection. Consequently, the connection management module 308 may give a higher priority to the interface with the highest ratio of connections established to connection attempts for that host address (or the lowest ratio of failed connection attempts to connection attempts). A variety of additional heuristics may be employed to arrive at a prioritized list of host IP address routes based on an evaluation of routing statistics.

In one embodiment, if there are no entries for a particular set of IP addresses for a particular host within the routing table, then the connection management module will determine if statics are available for the subnet associated with one or more of the IP addresses. As previously mentioned, in one embodiment, the statistics for all IP addresses associated with a particular subnet may be combined to arrive at a quality level for that subnet. For example, the round trip times for all of the IP addresses associated with that subnet may be averaged to arrive at an average round trip time. Similarly, the total number of connections established and connection attempts may be added together for that subnet to evaluate the subnet connection quality. The connection management module 320 may then choose an IP address associated with a subnet providing the best overall connection quality. In such a case, the networking engine 308 will then "clone" the subnet routing data and create a new entry for the specific host IP address within the routing table. Once a TCP socket connection is established using that specific IP address, the statistics collection module 305 will track the routing statistics 302 for the route associated with that specific IP address and update the routing table 301 accordingly.

In one embodiment, the routing table 301 may have entries for some of the IP addresses returned by the DNS query but may only have subnet entries for some of the other IP addresses. In one embodiment, under these conditions, the accumulated statistics associated with the subnet may be compared to the statistics associated with each specific IP address. If the statistics associated with a particular subnet indicate a relatively higher quality level than the statistics associated with a specific IP address, then the subnet routing data may be "cloned." Cloning is a well known technique in which a subnet entry in the routing table is copied to create an entry for a specific host. Alternatively, the specific IP addresses for which entries already exist in the routing table may be prioritized above the cloned subnet addresses (notwithstanding the higher quality statistics associated with the subnet addresses).

Using the techniques described above, if a particular host has both IPV6 and IPV4 addresses associated therewith, the connection management module 320 will select the addressing scheme which provides a relatively higher level of connection quality.

In one embodiment, after prioritizing the list of IP addresses returned in response to the DNS query, the connection management module 320 may attempt to connect to more than one of the IP addresses at a time and will establish a new TCP socket 321 using the first IP address from which a response is received. In addition, in one embodiment, if a TCP socket is not established with one of the initial IP addresses after a specified period of time (e.g., after 150% of the estimated round trip time associated with that IP address), the connection management module 320 may attempt to establish a connection to one or more of the next IP addresses within the prioritized list (while maintaining the open connection attempts to the first set of IP addresses).

As is known by those of skill in the art, IPV4 and IPV6 employ different forms of DNS queries. Specifically, an IPV4 DNS query is referred to as an "a-record query" and an IPV6 DNS query is referred to as a "quad-a record query." As mentioned above, if a particular host uses both IPV4 and IPV6 addresses then it may compare the quality of the IPV4 and IPV6 routes and choose the one that provides a relatively higher quality. In addition, in one embodiment, if the connection management module 320 receives a response from one type of query but does not receive a response from the other after a designated period of time, then it will proceed with the IP addresses that it has received. For example, if it receives IPV4 addresses in response to the a-record query but does not receive IPV6 addresses in response to the quad-a record query (after a specified duration or number of retries), then it will proceed to prioritize the IPV4 IP addresses and establish a connection as described above.

In addition, in one embodiment, the connection management module 320 will factor in the quality level of the received IP addresses when deciding whether to wait or to proceed. For example, in the above example, if the IPV4 addresses provide a quality level below a specified threshold, then the connection management module 320 may wait a relatively longer period of time to receive the IPV6 addresses and/or may submit one or more additional quad-a queries. By contrast, if the IPV4 addresses provide a reasonable quality level (i.e., above a specified threshold), then the connection management module 320 may proceed to prioritize the IPV4 addresses and establish a TCP connection within a relatively shorter time period.

In one embodiment, all of the techniques described herein are implemented by the networking engine transparently to the application 351 making the connection request. The application of this embodiment may simply make a call to the API exposed by the networking engine using a hostname and port (e.g., www.apple.com port 80) and the networking engine will use the above techniques to establish a TCP socket and hand the socket off to the application 351 when the connection is complete. The networking engine may be provided with the operating system of the computing device (e.g., a version of the Mac OSX™ or iOS™ operating systems). Thus, application programmers do not need to understand the intricate details related to how the networking engine 308 establishes connections to take advantage of the techniques described herein.

As shown in FIG. 4, the routing table 301 may include certain routes which are interface-specific (i.e., specific to en1 or en0 as indicated in interface column 312). Said another way, certain routes may be "scoped" to a particular interface. In other instances, entries for the same host/subnet address 310 may exist for multiple interfaces. In such a case, the statistics collection module 305 may store two different sets of statistics—one for each interface (notwithstanding the fact that the host IP address may be the same). The connection management module 320 may then select the interface which provides the best level of quality using the techniques described herein. In one embodiment, the routing table 301 is implemented as described in the following co-pending patent applications, which are assigned to the assignee of the present application and which are incorporated herein by reference:

U.S. Patent Application No. 2009/0304006, filed Sep. 30, 2008, entitled ROUTING TABLE BUILD ALGORITHM FOR A ROUTING TABLE THAT USES A SEARCH KEY CONSTRUCTED FROM PACKET DESTINATION ADDRESS AND OUTBOUND INTERFACE;

U.S. Patent Application No. 20090304005, filed Sep. 30, 2008, entitled ROUTING TABLE LOOKUP ALGORITHM EMPLOYING SEARCH KEY HAVING DESTINATION ADDRESS AND INTERFACE COMPONENT;

U.S. Patent Application No. 20090304001, filed Sep. 30, 2008, entitled SOURCE ADDRESS BASED ROUTING PROCESS;

U.S. Patent Application No. 20090304000, filed Sep. 30, 2008, entitled OUTBOUND TRANSMISSION OF PACKET BASED ON ROUTING SEARCH KEY CONSTRUCTED FROM PACKET DESTINATION ADDRESS AND OUTBOUND INTERFACE.

It should be noted, however, that the underlying principles of the invention are not limited to the specific implementations described in these co-pending patent applications.

In one embodiment, the routing table 301 described herein is implemented in the form of a radix tree (e.g., the PATRICIA trie used in BSD Unix) which requires a unique key for accessing a particular entry. Thus, as described in the co-pending applications above, in this embodiment, a key may be formed using a combination of both the interface ID and the host or subnet IP address. Once again, however, the underlying principles of the invention are not limited to this specific implementation.

Figure 5A:
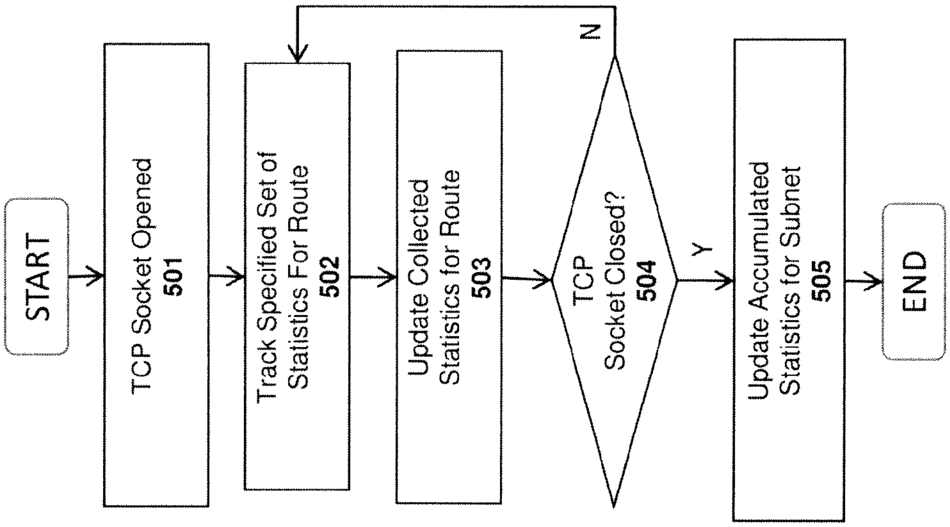
FIG. 5*a-b* illustrate one embodiment of a method for collecting and evaluating statistics for different network addresses and/or subnets when establishing network connections.

One embodiment of a method for tracking statistics for network routes to hosts is illustrated in FIG. 5*a*. This embodiment may be implemented on the architecture shown in FIG. 3*a*, but is not limited to such an architecture. At 501 a new TCP socket connection is opened with a host. At 502, a specified set of statistics are tracked for the opened TCP socket. As previously mentioned, this may include the round trip times and/or failed/successful connection attempts relative to total connection attempts. Other connection variables which may be considered include, by way of example and not limitation, number of packets in/out, number of bytes in/out, number of duplicate bytes received, number of out of order bytes received, number of retransmitted bytes, and average bandwidth.

At 503 the statistics for the IP address used for the current TCP socket are updated. This may occur continuously, during the time the TCP socket remains open and/or when the TCP socket is closed. At 504, if the TCP socket is closed, then at 505, the accumulated statistics for the subnet associated with the IP address is updated. For example, the round trip times for the current TCP socket may be combined with the average round trip times currently associated with the subnet to arrive at a new average. Similarly, the number of successful/failed connection attempts and total connection attempts may be added to those currently stored for the subnet address.

Figure 5B:
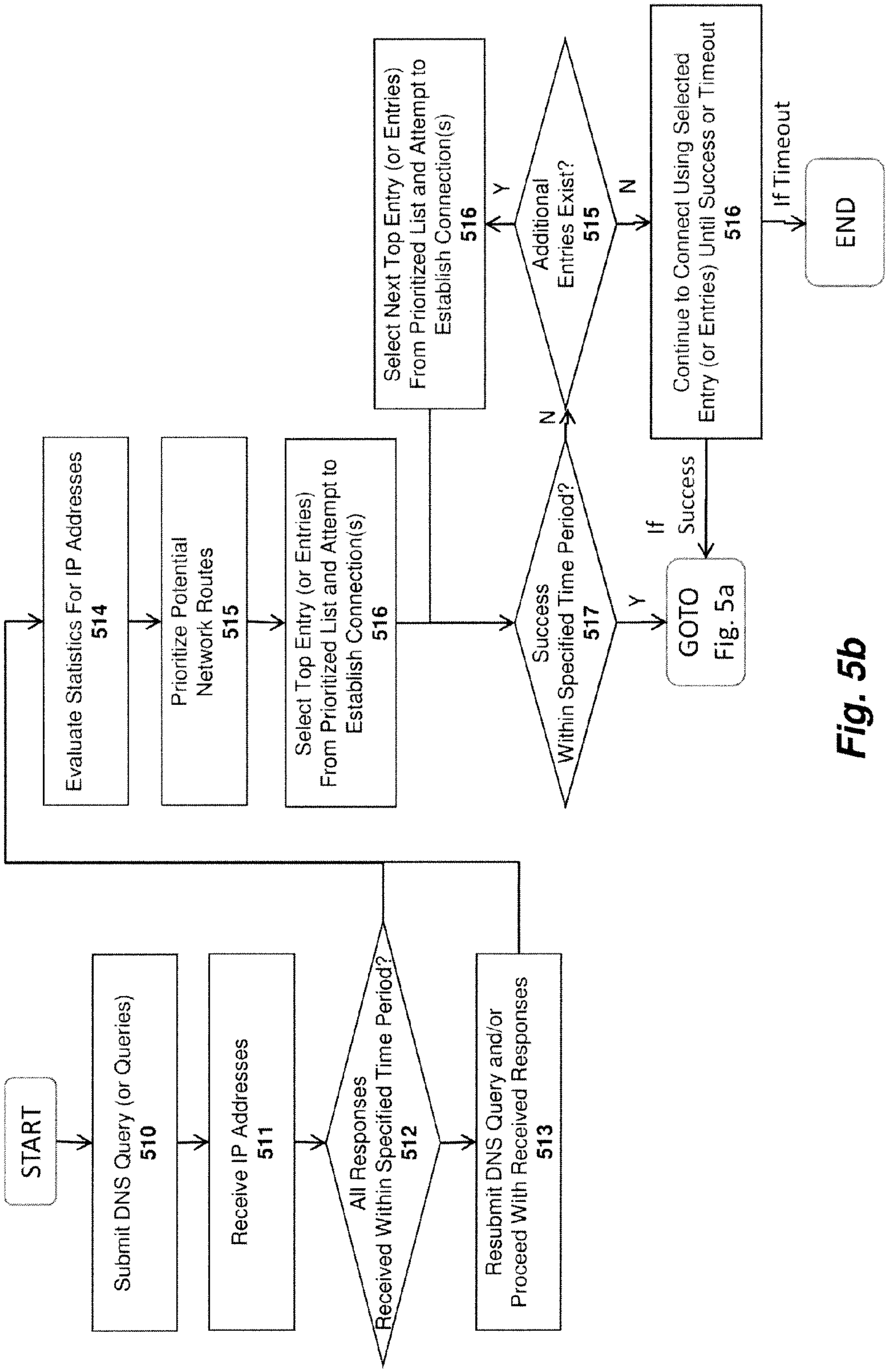

FIG. 5*b* illustrates one embodiment of a method for evaluating the stored statistics to select the highest "quality" route. At 510 one or more DNS queries are submitted. For example, in response to an application requesting a DNS query for a specified host name (e.g., www.google.com), an IPV4 query and/or IPV6 query may be submitted to the DNS server. At 511, the IPV4 and/or IPV6 addresses are received. At 512, if all responses have not been received within a specified time period, then at 513, the DNS query may be resubmitted and/or the process may proceed using the received responses.

At 512, if all responses have been received within a specified time period, or if at 513 a decision is made to proceed with the existing IP addresses, then at 514, the statistics associated with the routes for each IP address are evaluated (e.g., using round trip times, number of connection failures, etc). As previously described, if no statistics are available for a particular IP address, then the statistics associated with the subnet of that IP address may be evaluated. At 515, the potential set of network routes associated with the different IP addresses are prioritized based on the analysis of the statistics. If the subnet statistics are also not available, then these IP address may be prioritized relatively lower than those IP addresses for which information is available (assuming that the information indicates a potential connection of reasonable quality). At 516, the top one or more entries from the prioritized list are selected and a connection is attempted to these IP addresses. If a connection is successful, determined at 517, then a TCP socket is opened and the process returns to FIG. 5*a* (where statistics are collected for the open socket). If not, then if additional prioritized entries exist, determined at 515, then at 516 connections are attempted using the next one or more entries from the list are selected. If additional entries do not exist, then connections continue to be attempted using the existing entries until a timeout and/or success. In the latter case, the process proceeds back to FIG. 5*a* as described.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above are implemented with program code (e.g., software), the underlying principles of the invention may be implemented using any combination of hardware, software and/or firmware. Accordingly, the scope and spirit of the invention should be judged in terms of the claims below.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 6:
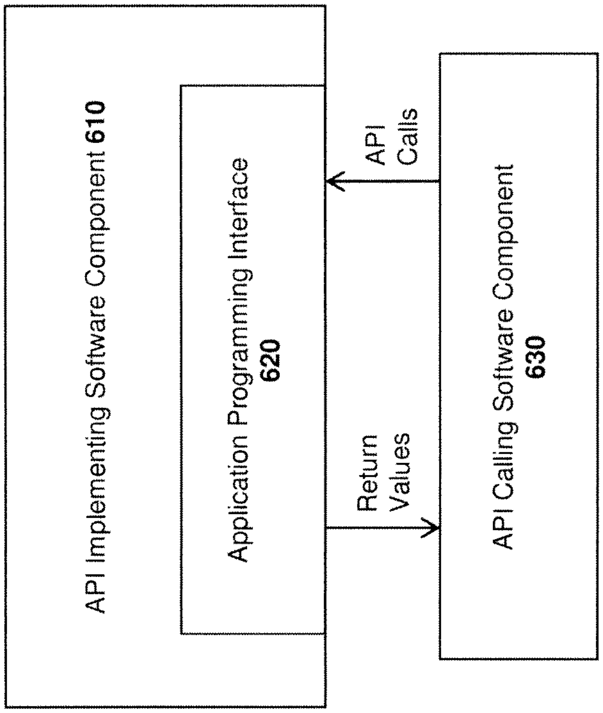
FIG. 6 illustrates a block diagram of an exemplary API architecture useable in some embodiments of the present invention.

FIG. 6 is a block diagram illustrating an exemplary API architecture, which may be used in some embodiments of the invention. As shown in FIG. 4, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 4 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a tangible machine-readable storage medium, which includes any mechanism for storing information in a form readable by a machine (e.g., a computer or other data processing system). For example, a tangible machine-readable storage medium includes magnetic disks, optical disks, random access memory (e.g. DRAM); read only memory, flash memory devices, etc.

Figure 7:
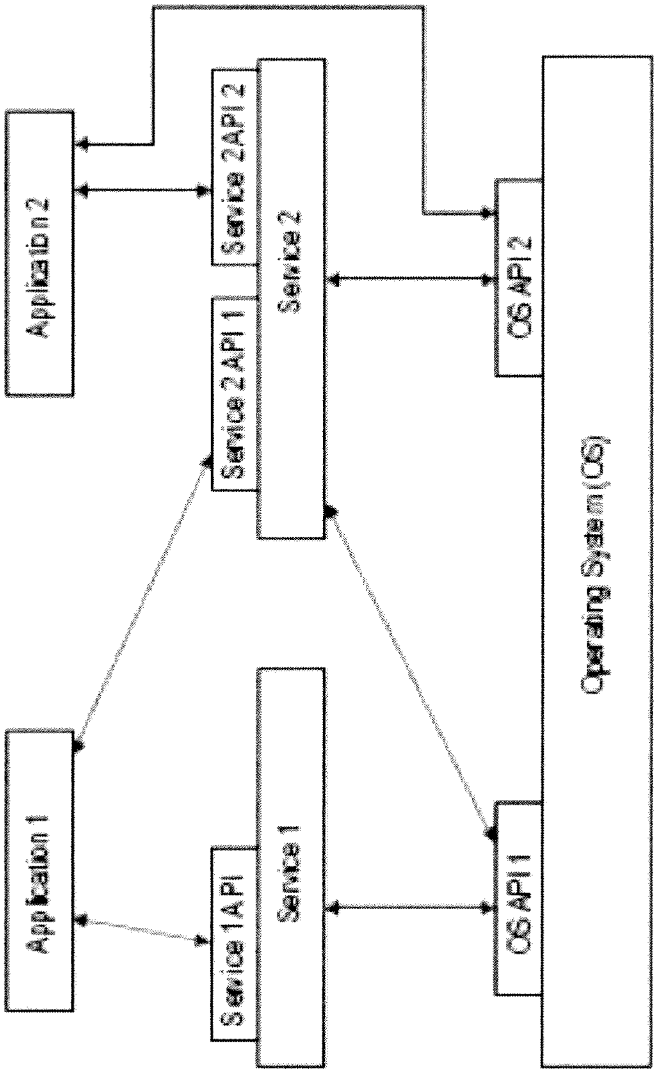
FIG. 7 shows an exemplary embodiment of a software stack useable in some embodiments of the present invention.

In FIG. 7 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 8:
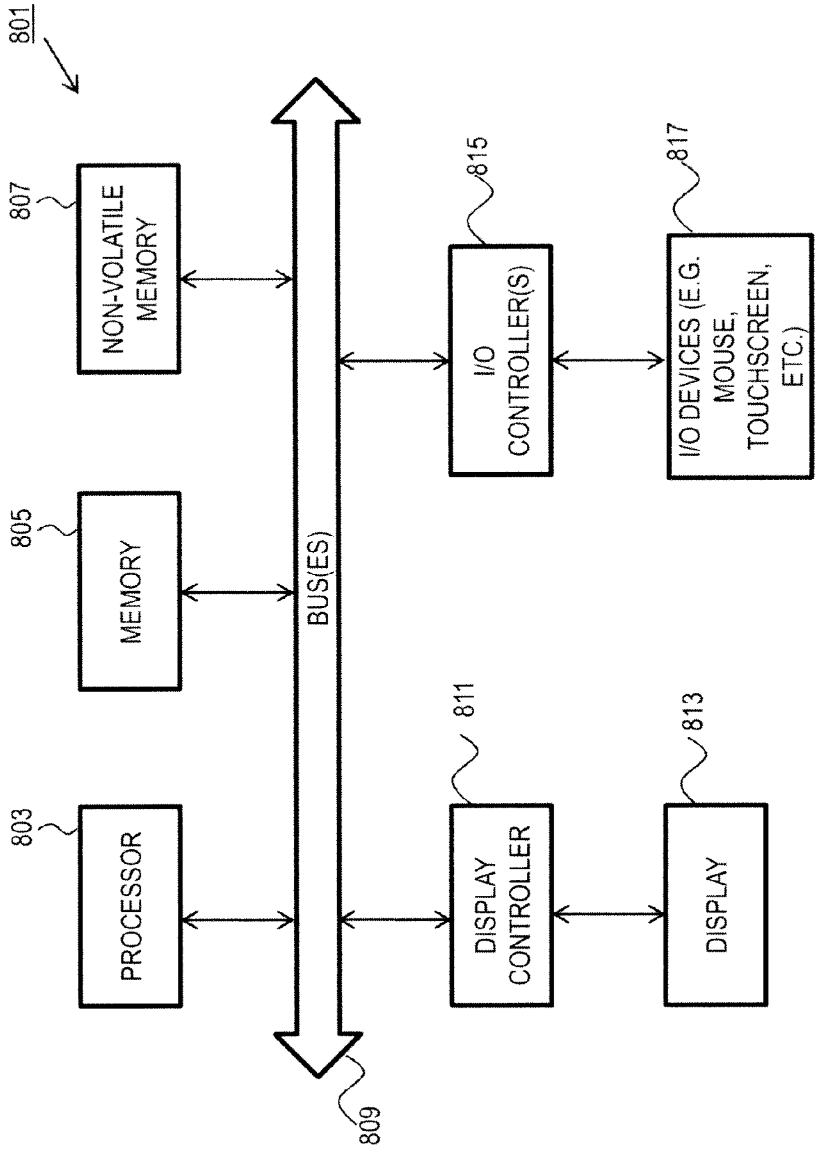
FIG. 8 shows, in block diagram form, an example of a data processing system which can be used with one or more embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 8 shows one example of a typical data processing system which may be used with the present invention. Note that while FIG. 8 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 8 may also be used with the present invention. The data processing system of FIG. 8 may be a Macintosh computer from Apple Inc. of Cupertino, Calif. (e.g., a Mac or a Macbook Pro). As shown in FIG. 8, the data processing system 801 includes one or more buses 809 which serve to interconnect the various components of the system. One or more processors 803 are coupled to the one or more buses 809 as is known in the art. Memory 805 may be DRAM or non-volatile RAM or may be flash memory or other types of memory. This memory is coupled to the one or more buses 809 using techniques known in the art. The data processing system 801 can also include non-volatile memory 807 which may be a hard disk drive or a flash memory or a magnetic optical drive or magnetic memory or an optical drive or other types of memory systems which maintain data even after power is removed from the system. The non-volatile memory 807 and the memory 805 are both coupled to the one or more buses 809 using known interfaces and connection techniques. A display controller 811 is coupled to the one or more buses 809 in order to receive display data to be displayed on a display device 813 which can display any one of the user interface features or embodiments described herein. The display device 813 can include an integrated touch input to provide a touch screen. The data processing system 801 can also include one or more input/output (I/O) controllers 815 which provide interfaces for one or more I/O devices, such as one or more mice, touch screens, touch pads, joysticks, and other input devices including those known in the art and output devices (e.g. speakers). The input/output devices 817 are coupled through one or more I/O controllers 815 as is known in the art. While FIG. 6 shows that the non-volatile memory 807 and the memory 805 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 809 may include one or more bridges or controllers or adapters to interconnect between various buses. In one embodiment, the I/O controller 815 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 805 or the non-volatile memory 807 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:

before receiving a set of potential network addresses for establishing a network connection to a remote host, establishing one or more network connections using one or more corresponding network addresses and storing routing statistics collected for routes for each of the one or more network addresses;

receiving the set of potential network addresses;

evaluating stored routing statistics corresponding to each of the potential network addresses, the evaluating comprising comparing routing statistics associated with each potential network address and, when routing statistics are not available for one or more of the potential network addresses, comparing available routing statistics associated with a subnet for the one or more of the potential network addresses;

prioritizing the set of potential network addresses based on the evaluation; and initially attempting to connect to the remote host using a highest priority one or more of the potential network addresses.

2. The method as in claim 1, wherein the set of potential network addresses include Internet Protocol Version 4 (IPV4) addresses and Internet Protocol Version 6 (IPV6) addresses.

3. The method as in claim 1, wherein, if the highest priority one or more of the potential network addresses do not result in a connection after a specified period of time, then choosing a next highest priority network addresses from the set of potential network addresses.

4. The method as in claim 1, wherein evaluating routing statistics associated with each of the potential network addresses comprises comparing round-trip times associated with each of the potential network addresses and prioritizing those potential network addresses with relatively lower round trip times relatively higher than those potential network addresses with relatively higher round trip times.

5. The method as in claim 1, wherein evaluating routing statistics associated with each of the potential network addresses comprises comparing the number of successful/failed connection attempts relative to the number of total connection attempts associated with each of the potential network addresses and prioritizing those potential network addresses with a relatively lower ratio of failed connection attempts to total connection attempts, or a relatively higher ratio of successful connection attempts to total connection attempts relatively higher than those potential network addresses with relatively higher or lower ratios, respectively.

6. The method as in claim 1, wherein the statistics associated with the subnet address comprise combined statistics from hosts associated with that subnet address.

7. The method as in claim 1, further comprising:

successfully establishing a network connection using one of the one or more of the potential network addresses;

tracking routing statistics associated with a route for the one of the one or more of the potential network addresses; and storing the routing statistics within a routing table on a client computing device.

8. The method as in claim 7, further comprising:

combining the routing statistics associated with the route for the one of the one or more of the potential network addresses with stored routing statistics associated with a subnet of the one of the one or more of the potential network addresses to update the routing statistics associated with the subnet.

9. The method as in claim 1, wherein a particular network address is associated with different network interfaces on a computing device, wherein evaluating further comprises individually evaluating separate sets of statistics for that particular network address, each of the separate sets of statistics associated with a different network interface, and prioritizing one of the network interfaces above another of the network interfaces for that particular network address based on the evaluation.

10. A non-transitory machine-readable medium having program code stored thereon which, when executed by a machine, causes the machine to perform the operations of:

before receiving a set of potential network addresses for establishing a network connection to a remote host, establishing one or more network connections using one or more corresponding network addresses and storing routing statistics collected for routes for each of the one or more network addresses;

receiving the set of potential network addresses;

evaluating stored routing statistics corresponding to each of the potential network addresses, the evaluating comprising comparing routing statistics associated with each potential network address and, when routing statistics are not available for one or more of the potential network addresses, comparing available routing statistics associated with a subnet for the one or more of the potential network addresses;

prioritizing the set of potential network addresses based on the evaluation; and initially attempting to connect to the remote host using a highest priority one or more of the potential network addresses.

11. The machine-readable medium as in claim 10, wherein the set of potential network addresses include Internet Protocol Version 4 (IPV4) addresses and Internet Protocol Version 6 (IPV6) addresses.

12. The machine-readable medium as in claim 10, wherein, if the highest priority one or more of the potential network addresses do not result in a connection after a specified period of time, then choosing a next highest priority network addresses from the set of potential network addresses.

13. The machine-readable medium as in claim 10, wherein evaluating routing statistics associated with each of the potential network addresses comprises comparing round-trip times associated with each of the potential network addresses and prioritizing those potential network addresses with relatively lower round trip times relatively higher than those potential network addresses with relatively higher round trip times.

14. The machine-readable medium as in claim 10, wherein evaluating routing statistics associated with each of the potential network addresses comprises comparing the number of successful/failed connection attempts relative to the number of total connection attempts associated with each of the potential network addresses and prioritizing those potential network addresses with a relatively lower ratio of failed connection attempts to total connection attempts, or a relatively higher ratio of successful connection attempts to total connection attempts relatively higher than those potential network addresses with relatively higher or lower ratios, respectively.

15. The machine-readable medium as in claim 10, wherein the statistics associated with the subnet address comprise combined statistics from hosts associated with that subnet address.

16. The machine-readable medium as in claim 10, comprising additional program code to cause the machine to perform the operations of:

successfully establishing a network connection using one of the one or more potential network addresses;

tracking routing statistics associated with a route for the one of the one or more potential network addresses; and storing the routing statistics within a routing table on a client computing device.

17. The machine-readable medium as in claim 16, further comprising additional program code to cause the machine to perform the operations of:

combining the routing statistics associated with the route for the one of the one or more potential network addresses with stored routing statistics associated with a subnet of the one of the one or more potential network addresses to update the routing statistics associated with the subnet.

18. The machine-readable medium as in claim 10, wherein a particular network address is associated with different network interfaces on a computing device, wherein evaluating further comprises individually evaluating separate sets of statistics for that particular network address, each of the separate sets of statistics associated with a different network interface, and prioritizing one of the network interfaces above another of the network interfaces for that particular network address based on the evaluation.

19. An apparatus having a memory for storing program code and a processor for processing the program code to perform the operations of:

before receiving a set of potential network addresses for establishing a network connection to a remote host, establishing one or more network connections using one or more corresponding network addresses and storing routing statistics collected for routes for each of the one or more network addresses;

receiving the set of potential network addresses;

evaluating stored routing statistics corresponding to each of the potential network addresses, the evaluating comprising comparing routing statistics associated with each potential network address and, when routing statistics are not available for one or more of the potential network addresses, comparing available routing statistics associated with a subnet for the one or more of the potential network addresses;

prioritizing the set of potential network addresses based on the evaluation; and initially attempting to connect to the remote host using a highest priority one or more of the potential network addresses.

20. The apparatus as in claim 19, wherein the set of potential network addresses include Internet Protocol Version 4 (IPV4) addresses and Internet Protocol Version 6 (IPV6) addresses.

21. The apparatus as in claim 19, wherein, if the highest priority one or more of the potential network addresses do not result in a connection after a specified period of time, then choosing a next highest priority network addresses from the set of potential network addresses.

22. The apparatus as in claim 19, wherein evaluating routing statistics associated with each of the potential network addresses comprises comparing round-trip times associated with each of the potential network addresses and prioritizing those potential network addresses with relatively lower round trip times relatively higher than those potential network addresses with relatively higher round trip times.

23. The apparatus as in claim 19, wherein evaluating routing statistics associated with each of the potential network addresses comprises comparing the number of successful/failed connection attempts relative to the number of total connection attempts associated with each of the potential network addresses and prioritizing those potential network addresses with a relatively lower ratio of failed connection attempts to total connection attempts, or a relatively higher ratio of successful connection attempts to total connection attempts relatively higher than those potential network addresses with relatively higher or lower ratios, respectively.

24. The apparatus as in claim 19, wherein the statistics associated with the subnet address comprise combined statistics from hosts associated with that subnet address.

25. The apparatus as in claim 19, comprising additional program code to cause the processor to perform the operations of:

successfully establishing a network connection using one of the one or more potential network addresses;

tracking routing statistics associated with a route for the one of the one or more potential network addresses; and storing the routing statistics within a routing table on a client computing device.

26. The apparatus as in claim 25, further comprising additional program code to cause the processor to perform the operations of:

combining the routing statistics associated with the route for the one of the one or more potential network addresses with stored routing statistics associated with a subnet of the one of the one or more potential network addresses to update the routing statistics associated with the subnet.

27. The apparatus as in claim 19, wherein a particular network address is associated with different network interfaces on a computing device, wherein evaluating further comprises individually evaluating separate sets of statistics for that particular network address, each of the separate sets of statistics associated with a different network interface, and prioritizing one of the network interfaces above another of the network interfaces for that particular network address based on the evaluation.

* * * * *